United States Patent [19]
Johnsen et al.

[11] Patent Number: 6,132,796
[45] Date of Patent: Oct. 17, 2000

[54] METHOD FOR PRODUCTION OF FEED FOR SALMONIDES AND FEED FOR SALMONIDES

[75] Inventors: Freddy Johnsen, Rånåsfoss; Leif Hjørnevik, Skien; Ole Ringdal, Porsgrunn, all of Norway

[73] Assignee: Norsk Hydro ASA, Oslo, Norway

[21] Appl. No.: 09/297,333

[22] PCT Filed: Oct. 22, 1997

[86] PCT No.: PCT/NO97/00279

§ 371 Date: Jun. 16, 1999

§ 102(e) Date: Jun. 16, 1999

[87] PCT Pub. No.: WO98/19560

PCT Pub. Date: May 14, 1998

[30] Foreign Application Priority Data

Nov. 1, 1996 [NO] Norway ..................... 964645

[51] Int. Cl.$^7$ .................... A23L 1/325
[52] U.S. Cl. .............. 426/643; 426/7; 426/654; 426/805
[58] Field of Search ............... 426/643, 7, 805, 426/654

[56] References Cited

U.S. PATENT DOCUMENTS 4,288,458  9/1981  Barnes .......................... 426/7
4,338,336  7/1982  Glabe et al. ..................... 426/1

FOREIGN PATENT DOCUMENTS 0009366   4/1980   European Pat. Off. .
1505388   3/1978   United Kingdom .
9635337   11/1996  WIPO .

OTHER PUBLICATIONS

Wood et al., Aquaculture, vol. 44(1), pp. 27–40, 1985.
Cisse et al., "Use of chemical or biological fish silage as feed for Chrysichthys nigrodigitatus (Bagridae)", Aquatic Living Resources 8 (4), 1995, 373–377.
Ali et al., "Evaluation of fish silage prepared from underutilized marine fishes as protein sources in the diet of major carp (Cirrhinus mrigala)", Journal of Aquaculture in the Tropics 9 (3), 1994, 247–254.
Chemical Abstracts, vol. 117, abstract No. 117:211478, 1992.

*Primary Examiner*—Chhaya D. Sayala
*Attorney, Agent, or Firm*—Wenderoth, Lind & Ponack, L.L.P.

[57] ABSTRACT

A method for production of fish feed containing fish products and standard feed components and fish feed products. Ammonium-, sodium- or potassium diformates, comprising formic acid or mixtures thereof are included in the fish products prior to their further processing and mixing with the other feed components. The final fish feed contains preferably 0.3–2.5 weight % formates based on the total feed.

5 Claims, No Drawings

METHOD FOR PRODUCTION OF FEED FOR SALMONIDES AND FEED FOR SALMONIDES

This application is a 371 application of International Application No. PCT/NO97/00279 filed Oct. 22, 1997.

The present invention relates to a method for production of feed for salmonides, like Atlantic salmon or rainbow trout, comprising processing fish products and standard feed components. The invention also comprises fish feed containing fish products and standard feed components.

Within the aquaculture industry there is a continuous search for improved feeds which will increase growth rate, feed utilisation, digestibility of protein and fat, etc. Within the field of animal feed there are known several types of additives to feeds which increase the growth rate for i.a. pigs and piglets. Among such additives are various types of formates, described in the unpublished patent application PCT/NO96/00114. However, addition of formates to fish feed has been found to have no effect.

The main object of the invention was to arrive at improved fish feed, comprising fish products, which would increase the growth rate, the digestibility of protein and fat and feed utilisation of the fish.

Another object was to obtain an improved feed for salmonides like Atlantic salmon and rainbow trout.

A further object was to arrive at a fish feed utilising the positive effects of feed additives used in animal feed.

Based on the positive results obtained by animal feed comprising formates, as described in the above stated application, the inventors started by composing a fish feed comprising fish products and standard fish feed components, and then incorporated minor amounts of various types of formates and/or formic acid. Such a feed was then fed to Atlantic salmon fingerlings in fresh water. The fish products could be fish meal or oil, fish remains commonly used in fish feed and minced fish.

The applied formates, comprising diformates, comprise sodium-, ammonium-, and potassium formate. Mixtures of said formates, with and without added formic acid, are also applicable. Potassium diformate, possibly mixed with formic acid, was found to be especially useful.

The diets used were the following: One diet containing 1 weight% 85% formic acid (Positive Control, PC), three diets containing 1.3 weight% different formates and one diet with no formic acid addition (Negative Control, NC).

The results of these tests were rather disappointing as the growth rate of the salmon fingerlings fed with diets containing formates or formic acid was lower than for those getting the negative control diet. However, some positive results were recorded. Thus, the digestibility of protein and fat was recorded to be higher when the diets contained formates or formic acid.

The lower growth and feed intake due to inclusion of formic acid or formates, and the higher nutrient digestibility, indicates that the lower feed utilisation efficiency for these diets was due to lower feed intake rather than reduced nutrient digestibility or other factors effecting nutrient utilisation efficiency. The main reason for reduced feed consumption may have been the taste of the acidified feed.

In view of the negative effects, especially with regard to growth rate, the inventors started looking for new ways of including the additives which after all seemed to have some positive effects. Different methods of producing the feed comprising addition of the additives at different stages of the production of the feed were then investigated. The most promising route seemed to be incorporation of the additives in the fish products prior to their further processing together with the other components of the final feed. The formates could be included in the fish raw material, for instance during storage or during processing to feed intermediates like fish meal or oil.

A new set of diets comprising corresponding negative- and positive control diets and diets comprising diformate were made by incorporation of the diformate and formic acid in the fish products which subsequently were further processed to fish feed in a conventional process. These diets were then fed to Atlantic salmon in sea water. It was then most surprisingly found that the new diets containing diformates resulted in increased growth compared with the control diets. Higher energy and protein digestibility were also recorded during these experiments for the diets containing formates.

Thus it was found that improved fish feed, comprising fish products and standard feed components, could be made by including ammonium-, sodium- or potassium diformates, comprising formic acid or mixtures thereof in the fish products prior to their further processing and mixing with other feed components.

The diformates were preferably included in the fish product, in amounts of 1–5 weight % prior to mixing and process it with the other feed components, in amounts resulting in 0.3–0.5 weight % formates, based on the total feed. The preferred fish product would be fish meal and the preferred diformate applied would be potassium diformate.

The new improved fish feed, comprising fish products and standard feed components, contained at least one fish product component having included therein before its mixing with the other feed components, ammonium-, sodium- or potassium diformate or mixtures thereof. This new feed contained preferably 0.3–2.5 weight % formates and/or formic acid based on the total feed.

The scope and special features of the invention are as defined in the attached claims.

The invention is further described and explained in the following examples.

EXAMPLE 1

This example shows the effects on Atlantic salmon fingerlings in fresh water when fed with different types of diets, with and without formates and formic acid. The salmons had an average weight of 30 grams and were distributed in 15 m$^3$ fiberglass tanks supplied with fresh water. Each tank contained about 200 fish, giving a total weight of 6 kilo grams in each tank. The temperature during the test was on the average about 9° C.

The diets were produced with a twin screw extruder. The formic acid and the formates were added to the diets before extrusion. All the formulated products were extrusion stable. The formic acid (85%) was added by spraying into the mash during mixing and was added at a 1 weight % level. The formates were added at a 1.3 weight % level, in order to achieve corresponding amounts of formates as from formic acid. The diets were a negative control (NC) without any formic acid, a positive control (PC) with formic acid (diet 1) and 3 diets containing different formates. All diets were based on the same ground mix consisting of fish meal, fish oil, grounded wheat, digestible starch, pigment, minerals and vitamins. To all diets there were added 85 mg/kg yttrium oxide ($Y_2O_3$) as an indicator for digestibility.

The following diets were used during the experiments, Table 1.

TABLE 1

| Diet Number | Additive | Inclusion level % | Formates % | Dry matter % |
| --- | --- | --- | --- | --- |
| 1 | Formic acid | 1 | 0.74 | 93.8 |
| 2 | Formate 1 | 1.3 | 0.77 | 93.8 |
| 3 | Formate 2 | 1.3 | 0.93 | 93.8 |
| 4 | Formate 3 | 1.3 | 0.80 | 93.8 |

The composition of the formates used was as shown in Table 2.

TABLE 2

| Component | Formate 1 | Formate 2 | Formate 3 |
| --- | --- | --- | --- |
| Potassium diformate | 88% | 49.3 | 49.3 |
| Trisodium tetraformate | | 24.6 | 17.2 |
| Sodium diformate | | | 32.0 |
| Calcium formate | 10.5 | 24.6 | |
| Water | 0.5 | 0.5 | 0.5 |
| Silicate | 1.0 | 1.0 | 1.0 |
| Total Formate | 68.2 | 69.0 | 71.9 |

The chemical composition of dry diets was as shown in Table 3.

TABLE 3

| Nutrient | Content Dry Pellets % |
| --- | --- |
| Protein | 51.2 |
| Fat | 24.3 |
| NFE | 15.5 |
| Ash | 8.5 |
| Water | 6.2 |
| Indicator | 85 ppm |

The fish fed dry feed were fed by automatic feeders ad-lib in period 1 and iso energetically according to biomas in period 2. The fish were fed 24 hours per day at intervals of 15 minutes. Feed intake measurements were done by daily collection of excess feed. Feed intake was the difference between distributed feed and feed collected. At the end of period 2 the apparent digestibility of the dietary fat and protein was determined according to Austreng (1978) and Maynard (1978). The average weight of the salmon was 50 grams varying from 40–65 grams. There was no mortality during the experiments.

The specific growth rate (SGR) for periods 1 and 2 and weight increase (WI) in grams/day for the same periods are shown in Table 4.

TABLE 4

| Diet | Diet No. | SGR-1 % | SGR-2 % | SGR-tot. % | WI-1 g/day | WI-2 g/day |
| --- | --- | --- | --- | --- | --- | --- |
| NC | 5 | 0.96 | 1.04 | 0.99 | 11.14 | 13.63 |
| PC | 1 | 0.40 | 0.73 | 0.55 | 4.27 | 7.66 |
| Formate-1 | 2 | 0.43 | 0.76 | 0.58 | 4.62 | 7.95 |
| Formate-2 | 3 | 0.41 | | | 4.24 | |
| Formate-3 | 4 | 0.53 | | | 5.67 | |

The salmon grew more slowly during period 1 than in period 2. Fish fed feed without formic acid grew better than fish fed diets with added formic acid (PC) or formates. There was a clear drop in feed intake in the treatments with acidified feeds in the diets. Each fish fed the negative control diet consumed on the average 11.9 grams feed during period 2 compared to 8.2 and 8.1 grams/fish for fish fed diets containing formates or formic acid, respectively.

The recorded digestibility in % for fat and protein and feed conversion ratio (FCR) for period 1 and 2 are shown in Table 5.

TABLE 5

| Diet | Diet No. | Protein % D | Fat % D | FCR-1 | FCR-2 |
| --- | --- | --- | --- | --- | --- |
| NC | 5 | 89.93 | 97.03 | 1.14 | 0.87 |
| PC | 1 | 91.55 | 97.74 | 2.38 | 1.06 |
| Formate-1 | 2 | 90.93 | 97.13 | 2.18 | 1.03 |
| Formate-2 | 3 | | | | 2.19 |
| Formate-3 | 4 | | | | 1.99 |

Fish fed diets with formates or formic acid had significantly higher protein digestibility than fish fed negative control diets.

EXAMPLE 2

Potassium diformate was included into the feeds either prior, (one day), to fish meal production (F 1) or prior to feed production (F 2). The trials were conducted with Atlantic salmon, weighing about 650 grams at start, for 80 days. The fish were allocated in 1 m$^3$ fiberglass tanks supplied with sea water, with 24 fish in each tank. The fish were fed ad-lib 24 hours a day at 15 minutes intervals. The trial was divided into three periods of 28, 28 and 24 days, respectively. The fish were fed, in triplicate, ad libitum and the feed losses were recorded every day. A control diet (Control) without addition of formate was also part of the trial. The diets were produced on a twin screw extruder. All dry ingredients were mixed together prior to extrusion, and the oil was added posterior to drying in a fluid bed.

The formate used during the tests had the following composition shown in Table 6:

TABLE 6

| Composition | Formate-4 % |
| --- | --- |
| Potassium diformate | 98.7 |
| Water | 0.3 |
| Silicate | 0.1 |
| Total Formate | 68.3 |

The proximate composition of the fish meals are shown in Table 7.

TABLE 7

| Composition | Standard | With Formate-4 |
| --- | --- | --- |
| Crude protein % | 75.2 | 75.2 |
| Water % | 4.5 | 4.8 |
| Ash % | 9.7 | 11.0 |
| Fat % | 10.4 | 8.8 |
| Salt (NaCl) % | 0.77 | 0.81 |
| TVN[1] % | 0.12 | 0.14 |
| Potassium % | 1.3 | 2.2 |
| Formate-4 % | 0 | 2.7 |

TVN[1] Total volatile Nitrogen.

Composition and analysed chemical content in the experimental diets are given in Tables 8 and 9, all figures are given i %.

TABLE 8

| Composition | Control | F-1 | F-2 |
|---|---|---|---|
| Fish meal, standard | 49.68 | 0 | 49.98 |
| Fish Meal with Form. | 0 | 49.83 | 0 |
| Fish oil | 24.85 | 25.65 | 24.8 |
| Wheat | 20.3 | 19.4 | 18.5 |
| Water | 4.4 | 4.35 | 4.6 |
| Formate | 0 | 0 | 1.3454 |
| Vitamin premix | 0.5 | 0.5 | 0.5 |
| Mineral premix | 0.2 | 0.2 | 0.2 |
| Pigment | 0.07 | 0.07 | 0.07 |

TABLE 9

|  | Control | F-1 | F-2 |
|---|---|---|---|
| Dry matter | 96.3 | 94.4 | 96.4 |
| Protein | 45.4 | 44.5 | 45.9 |
| Fat | 29.6 | 29.7 | 30.7 |
| Ash | 6.1 | 6.3 | 6.5 |
| NFE[1] | 15.2 | 13.9 | 13.3 |
| Gross energy, MJ/kg | 24.8 | 24.4 | 24.8 |

NFE[1] Dry matter = protein + fat + ash

The results of the experiments are shown in the following tables. Table 10 shows the growth increases from start weight in grams to the weights at the end of periods 1–3.

TABLE 10

| Diet | Start weight | Weight Period 1 | Weight Period 2 | Weight Period 3 |
|---|---|---|---|---|
| Control | 650.3 | 831.7 | 1059.0 | 1219 |
| F-1 | 652.1 | 835.7 | 1093.3 | 1303 |
| F-2 | 648 | 816 | 1022 | 1180 |

As can be seen from table 10 the growth of salmons fed with diets containing diformates included in the fish meal prior to the production of the feed (F-1) was significantly higher than when the formate was added during the production of the feed (F-2). The latter diet resulted in fact in a lower growth than when the fish were fed with the Control diet. This confirms the results from example 1.

The digestibility of fat, protein, dry matter (DM), ash NFE and gross energy in Atlantic salmon fed either control diet or diets F-1 or F-2 are shown in Table 11.

TABLE 11

| Diet | Fat | Protein | DM | Ash | NFE | Energy |
|---|---|---|---|---|---|---|
| Control | 96.4 | 90.1 | 77.9 | 3.9 | 35.3 | 88.5 |
| F-1 | 97.0 | 91.1 | 79.3 | 14.0 | 33.9 | 89.8 |

TABLE 11-continued

| Diet | Fat | Protein | DM | Ash | NFE | Energy |
|---|---|---|---|---|---|---|
| F-2 | 96.3 | 91.0 | 79.1 | 7.2 | 33.7 | 89.5 |

The digestibility of protein, dry matter and energy was significantly higher for diets F-1 and F-2 than for the Control diet. The digestibility of ash was three-fold higher for F-1 than for Control and F-2.

The above experiments clearly show that it is essential at what stage of the feed production the diformate comprising formic acid is included. In order to obtain the above positive results with regard to growth increase, digestibility of fat and protein etc. the diformate comprising formic acid should be included in the fish product component of the feed prior to further processing this component together with the other components into the final feed. The amount of formate and formic acid to be included in the fish product component depend on the relative amount of this component in the final feed. The amount of fish products may be varied within wide limits, for instance from 20–60 weight % of the total feed. Said amount, calculated on a formate basis, of the total feed should be in the range of 0.3–2.5 weight %.

What is claimed is:

1. A method for production of fish feed, comprising fish products and fish feed components, comprising ammonium diformate, sodium diformate, or potassium diformate sodium tetraformate, or mixtures thereof and optionally formic acid, in the fish products in amounts of 1–5 weight % prior to their further processing to meal and mixing with the fish feed components in amounts resulting in 0.5–2.5 weight % diformates/sodium tetraformate based on the total feed.

2. A method according to claim 1, wherein potassium diformate is included in fish meal in an amount of 1–1.5 weight %.

3. A method according to claim 1, wherein fish remains or minced fish preserved with diformates are mixed with the fish feed components and processed into fish feed.

4. A fish feed comprising fish products and fish feed components, wherein the fish products contain ammonium diformate, potassium diformate or sodium diformate or sodium tetraformate, or mixtures thereof, and optionally formic acid, and the amount of the fish products is 20–60 weight % of the total feed.

5. A fish feed according to claim 4, wherein the fish products contain 1–5 weight % diformates/sodium tetraformate, and optionally formic acid, resulting in amounts of diformates/sodium tetraformate of 0.3–2.5 weight % based on the total feed.

* * * * *